US012519379B2

(12) United States Patent
Peng et al.

(10) Patent No.: US 12,519,379 B2
(45) Date of Patent: Jan. 6, 2026

(54) SYNCHRONOUS ELECTRIC MACHINE WITH RECONFIGURABLE ROTOR AND STATOR POLES

(71) Applicant: GM GLOBAL TECHNOLOGY OPERATIONS LLC, Detroit, MI (US)

(72) Inventors: Peng Peng, Columbus, OH (US); Thomas W. Nehl, Shelby Township, MI (US); Derek F. Lahr, Howell, MI (US); Alireza Fatemi, Canton, MI (US); Lei Hao, Troy, MI (US); Suresh Gopalakrishnan, Troy, MI (US); Avoki M. Omekanda, Rochester, MI (US); Renato Amorim Torres, Pontiac, MI (US); Mazharul Chowdhury, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 18/490,057

(22) Filed: Oct. 19, 2023

(65) Prior Publication Data

US 2025/0132651 A1    Apr. 24, 2025

(51) Int. Cl.
*H02K 3/28* (2006.01)
*H02K 19/12* (2006.01)

(52) U.S. Cl.
CPC ............... *H02K 19/12* (2013.01); *H02K 3/28* (2013.01)

(58) Field of Classification Search
CPC ........... H02K 3/00; H02K 3/28; H02K 17/00; H02K 17/06; H02K 17/14; H02K 11/00; H02K 11/30; H02K 19/00; H02K 19/10; H02K 19/12; H02K 19/26; H02K 19/28; H02K 19/32

See application file for complete search history.

(56) References Cited

U.S. PATENT DOCUMENTS

| 4,292,531 A * | 9/1981 | Williamson | B60L 50/13 318/158 |
| 2013/0241463 A1* | 9/2013 | Bando | H02P 9/102 318/810 |
| 2022/0302863 A1* | 9/2022 | Ota | H02P 21/22 |

FOREIGN PATENT DOCUMENTS

| CN | 105490490 A | 4/2016 | |
| CN | 113013918 A * | 6/2021 | ............. H02K 19/26 |
| CN | 113595293 A | 11/2021 | |

(Continued)

OTHER PUBLICATIONS

Mayuram R. Krishnamurthy, Rengaramanujam Srinivasan; Speed-Changing Two-Phase Induction Motors, Part I: Pole Amplitude Modulation Techniques; IEEE Transactions on Power Apparatus and Systems, Jul./ Aug. 1970, pp. 1322-1335.

(Continued)

*Primary Examiner* — Tran N Nguyen
(74) *Attorney, Agent, or Firm* — Quinn IP Law

(57) ABSTRACT

A magnet-free electric machine. The electric machine may include a stator including a first stator winding set and a second stator winding set and a rotor including a first rotor winding set and a second rotor winding set. The electric machine may include a power transfer circuit configured for controlling a polarity and/or a phase sequence of excitation currents used in exciting the first and second stator and rotor windings, and thereby, respectively generated stator and rotor poles.

19 Claims, 7 Drawing Sheets

(56) References Cited

FOREIGN PATENT DOCUMENTS

CN 116436252 A 7/2023
DE 102013208544 A1 11/2014

OTHER PUBLICATIONS

Mohamed Osama, Thomas A. Lipo; A New Inverter Control Scheme for Induction Motor Drives Requiring Wide Speed Range; IEEE Tranactions on Industry Applications, vol. 32, No. 4, Jul./Aug. 1996; pp. 938-944.
B.S. Umesh, K. Sivakumar; A New Inverter Control Scheme for Induction Motor Drives Requiring Wide Speed Range; IEEE Transactions on Industrial Electronics, vol. 63, No. 9, Sep. 2016; pp. 5376-5383.
Mohamed Osama, Thomas A. Lipo; Modeling and Analysis of a Wide-Speed-Range Induction Motor Drive Based on Electronic Pole Changing; IEEE Transactions on Industry Applications, vol. 33, No. 5, Sep./Oct. 1997; pp. 1177-1184.
Chiara Conto, Nicola Bianchi; On the Possibility to Achieve a Pole Change in Synchronous Motors; 2022 IEEE Energy Conversion Congress and Exposition.
German Search Report dated Jul. 20, 2024.

\* cited by examiner

SYNCHRONOUS ELECTRIC MACHINE WITH RECONFIGURABLE ROTOR AND STATOR POLES

INTRODUCTION

The present disclosure relates to electric machines, such as but not necessarily limited to electric machines operable for converting electrical power to mechanical power for purposes of propelling a vehicle.

An electric machine may include a stator and a rotor, with the rotor being operable for rotating relative to the stator to perform work, such as for purposes of generating mechanical power. Such an electric machine may be referred to as an electric vehicle motor when configured for converting electrical power to mechanical power for purposes of propelling a vehicle. In the past, electric machines have included rare-earth or permanent magnets in an attempt to meet desirable or competitive torque, power, and/or efficiency levels. The types of magnets employed in such electric machines may be relatively expensive, scarce, complicated to manufacture, and/or otherwise prone to shortcomings, which historically have been accepted due to the beneficial torque, power, and/or efficiency.

SUMMARY

One non-limiting aspect of the present disclosure relates to a magnet-free electric machine operable for providing desirable or competitive torque, power, and/or efficiency levels without relying on the use of rare-earth, permanent, or other magnets to generate persistent magnetic fields. The magnet-free electric machine may include rotor and stator windings and a power transfer circuit configured for actively controlling an electrical excitation thereof based on operating conditions and/or other metrics so as to correspondingly reconfigure the resulting rotor and stator poles in a manner intended to achieve targeted torque, power, and/or efficiency levels.

One non-limiting aspect of the present disclosure relates to a magnet-free synchronous electric motor with reconfigurable rotor and stator poles. The electric machine may include a stator including a plurality of stator windings wrapped around a plurality of circumferentially spaced stator protrusions. A first stator winding set of the stator windings may be wrapped relative to a first stator protrusion set of the circumferentially spaced stator protrusions and a second stator winding set of the stator windings may be wrapped relative to a second stator protrusion set of the circumferentially spaced stator protrusions. The electric machine may include a rotor including a plurality of rotor windings wrapped around a plurality of circumferentially spaced rotor protrusions. A first rotor winding set of the rotor windings may be wrapped relative to a first rotor protrusion set of the circumferentially spaced rotor protrusions and a second rotor winding set of the rotor windings may be wrapped relative to a second rotor protrusion set of the circumferentially spaced rotor protrusions. The electric machine may include a power transfer circuit configured for controlling a polarity and/or a phase sequence of excitation currents used in exciting the first and second stator and rotor windings, and thereby, respectively generated stator and rotor poles.

The power transfer circuit may be operable for providing a first quantity of the stator poles by providing the first stator winding set with the polarity and the phase sequence of the excitation currents thereof respectively having a first polarity and a first phase sequence and providing the second stator winding set with the polarity and the phase sequence of the excitation currents thereof respectively having the first polarity and a second phase sequence.

The power transfer circuit may be operable for providing a second quantity of the stator poles by providing the first stator winding set with the polarity and the phase sequence of the excitation currents thereof respectively having the first polarity and a third phase sequence and providing the second stator winding set with the polarity and the phase sequence of the excitation currents thereof respectively having a second polarity opposite to the first polarity and a fourth phase sequence.

The stator windings may include a first leg, a second leg, a third leg, a fourth leg, a fifth leg, and a sixth leg, optionally with the first stator winding set including the first leg, the fourth leg, and the fifth leg, the second stator winding set including the second leg, the third leg, and the sixth leg.

The first phase sequence may include an A-phase, a B-phase, and a C-phase, optionally with the first leg receiving the A-phase, the fourth leg receiving the B-phase, and the fifth leg receiving the C-phase. The second phase sequence may include an A'-phase, a B'-phase, and a C'-phase, optionally with the second leg receiving the A'-phase, the third leg receiving the B'-phase, and the sixth leg receiving the C'-phase. The third phase sequence may include the A-phase, the B-phase, and the C-phase, optionally with the first leg receiving the A-phase, the fourth leg receiving the C-phase, and the fifth leg receiving the B-phase. The fourth phase sequence may include the A'-phase, the B'-phase, and the C'-phase, optionally with the second leg receiving the A'-phase, the third leg receiving the C'-phase, and the sixth leg receiving the B'-phase.

The first polarity may correspond with a positive polarity and the second polarity may correspond with a negative polarity.

The power transfer circuit may be operable for providing a first quantity of the rotor poles by providing the first rotor winding set with the polarity of the excitation currents thereof having a first polarity and providing the second rotor winding set with the polarity of the excitation currents thereof having the first polarity.

The power transfer circuit may be operable for providing a second quantity of the rotor poles by providing the first rotor winding set with the polarity of the excitation currents thereof having the first polarity and providing the second rotor winding set with the polarity of the excitation currents thereof having a second polarity opposite to the first polarity.

The first and second rotor windings may each have a single-phase configuration such that the first rotor windings are arranged to include no more than a first rotor leg and the second rotor windings are arranged to include no more than a second rotor leg.

The first and second rotor windings may each have a three-phase configuration, optionally with the first rotor windings arranged to include a first rotor leg, a second rotor leg, and a third rotor leg and the second rotor windings arranged to include a fourth rotor leg, a fifth rotor leg, and a sixth rotor leg.

The three-phase configuration may include the first, second, and third rotor legs connected in series and the fourth, fifth, and sixth rotor legs connected in series.

The first, second, third, fourth, fifth, and sixth rotor legs may be formed with conductors, optionally with the second and third rotor legs wrapped with less turns of the conductors than the first rotor leg and the fifth and sixth rotor legs wrapped with less turns of the conductors than the fourth rotor leg.

The three-phase configuration may include the first rotor leg connecting in parallel with the second rotor leg and the first and second rotor legs connected in series with the third rotor leg, and the fourth quarter leg connecting a parallel with the fifth rotor leg and the fourth and fifth rotor legs connected in series with the sixth rotor leg.

The first, second, third, fourth, fifth, and sixth rotor legs may be formed with conductors, optionally with the conductors of the first and second legs having a smaller cross-sectional area than the conductors of the third rotor leg and the conductors of the fourth and fifth rotor legs having a smaller cross-sectional area than the conductors of the sixth rotor leg.

One non-limiting aspect of the present disclosure relates to an electric machine with reconfigurable machine poles. The electric machine may include a stator having a plurality of stator windings arranged into a first stator leg, a second stator leg, a third stator leg, a fourth stator leg, a fifth stator leg, and a sixth stator leg, a rotor having a plurality of rotor windings arranged into a first rotor leg and a second rotor leg, a power transfer circuit. The power transfer circuit may be configured for providing: a first quantity of machine poles by delivering excitation currents to the first, fourth, and fifth stator legs with a first polarity and a first phase sequence, to the second, third, and sixth stator legs with the first polarity and a second phase sequence, and the first rotor leg with the first polarity and to the second rotor leg with the first polarity; and a second quantity of machine poles by delivering excitation currents to the first, fourth, and fifth legs with the first polarity and a third phase sequence, to the second, third, and sixth legs with a second polarity and a fourth phase sequence, to the first rotor leg with the first polarity and to the second rotor leg with the second polarity.

The first and second rotor legs may each have a single-phase configuration.

The first and second rotor legs may each have a three-phase configuration, optionally with the three-phase configuration including a first rotor leg, a second rotor leg, and a third rotor leg connected in series, with the first, second, and third rotor legs being formed with conductors such that the first and second rotor legs are wrapped with less turns of the conductors than the third rotor leg.

The first and second rotor legs may each have a three-phase configuration, optionally with the three-phase configuration including a first rotor leg, a second rotor leg, and a third rotor leg, with the first rotor leg connecting in parallel with the second rotor leg and the first and second rotor legs connected in series with the third rotor leg.

The first, second, and third legs may be formed with conductors, optionally with the conductors of the first and second legs having a smaller cross-sectional area than the conductors of the third leg.

One non-limiting aspect of the present disclosure relates to a vehicle. The vehicle may include an electric motor configured for converting electrical power to mechanical power for purposes of propelling the vehicle. The electric motor may include a stator including a first stator winding set and a second stator winding set, a rotor including a first rotor winding set and a second rotor winding set, and a power transfer circuit configured for controlling a polarity and/or a phase sequence of excitation currents used in exciting the first and second stator and rotor windings, and thereby, respectively generated stator and rotor poles.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
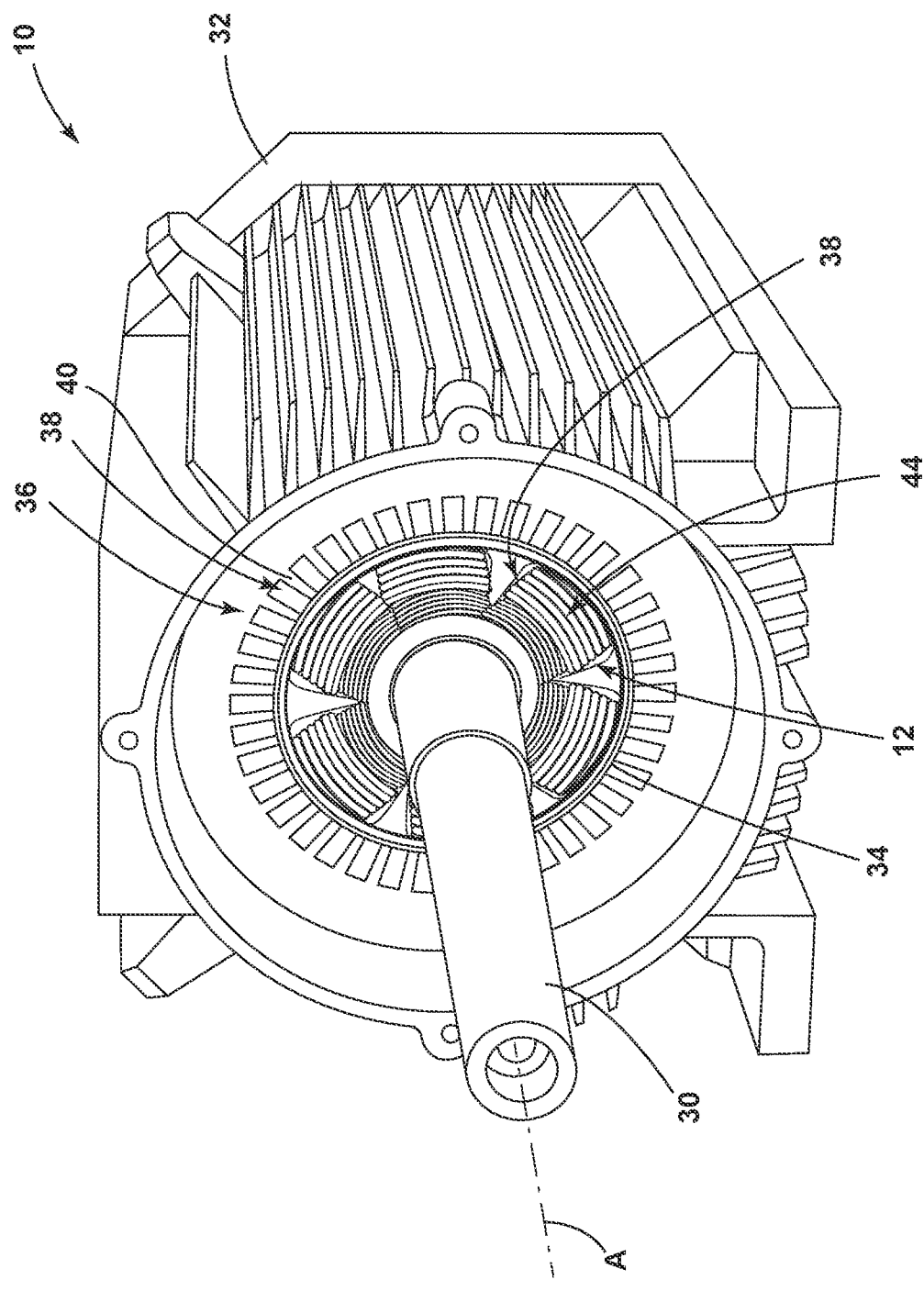
FIG. 1 illustrates a schematic view of an electric machine in accordance with one non-limiting aspect of the present disclosure.
Figure 2:
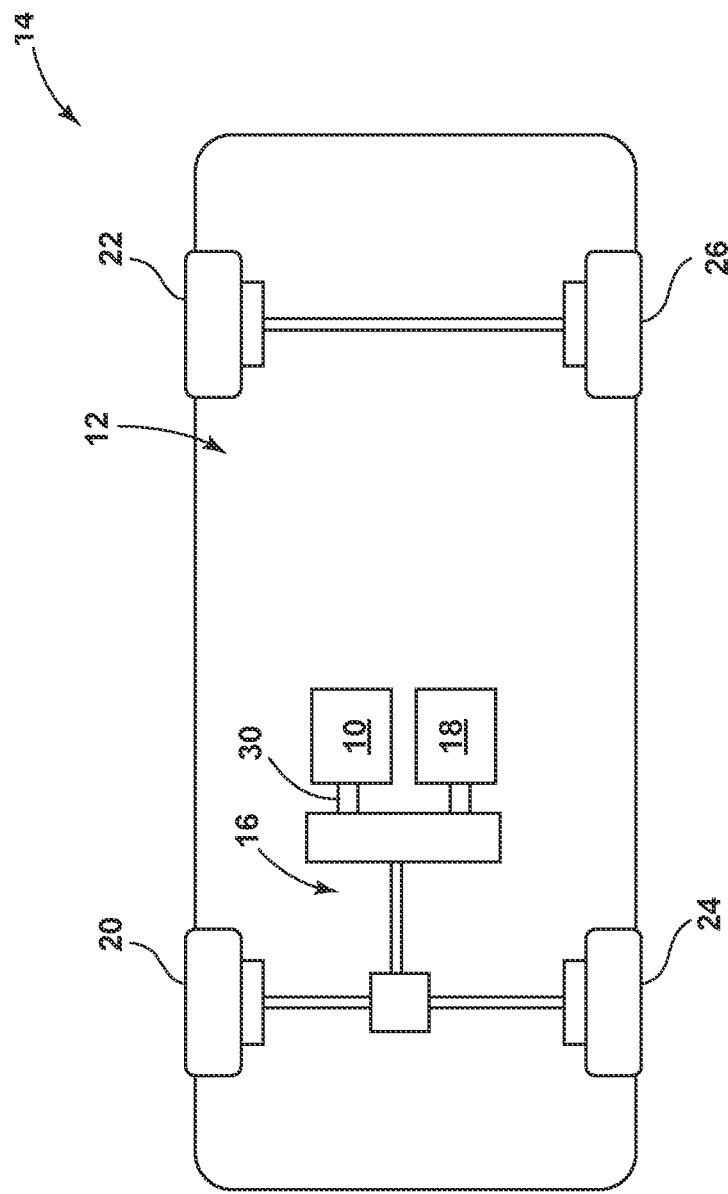
FIG. 2 illustrates a schematic view of a vehicle having the electric vehicle motor in accordance with one non-limiting aspect of the present disclosure.

FIG. 1 illustrates a schematic view of an electric machine 10 in accordance with one non-limiting aspect of the present disclosure. The electric machine 10 may be of the type employing a rotor 12 to impart mechanical force to a load in proportion to an electrical excitation thereof and/or to generate electrical energy in response to the rotation thereof. The electric machine 10, at least in the illustrated configuration, may be referred to as an electric vehicle motor 10 operable for propelling a vehicle and/or regenerative braking. FIG. 2 illustrates a schematic view of a vehicle 14 having the electric vehicle motor 10 in accordance with one non-limiting aspect of the present disclosure. The electric vehicle motor 10 may be employed within the vehicle 14 to facilitate imparting mechanical power to a propulsion system, powertrain, or drivetrain 16 operable for propelling or otherwise driving the vehicle 14. The vehicle 14 is illustrated as a hybrid type due to the powertrain 12 optionally including an internal combustion engine (ICE) 18 for generating mechanical power. The powertrain 16 may include a transmission, a driveshaft, a differential, axles and/or other componentry to facilitate conveying rotative force from a rotor shaft 30 coupled with the rotor 12 (see FIG. 1) to the wheels 20, 22, 24, 26. The vehicle 14 is shown to include the powertrain 12 operable with the front wheels 20, 24 for exemplary purposes. While illustrated as an electric vehicle motor 10, the present disclosure fully contemplates the electric machine 10 being operable for other purposes, applications, and within other environments whereby it may be beneficial to convert electrical power to mechanical power.

Referring to FIG. 1, the electric machine 10 may include a housing 32 configured to support a rearward end (not shown) of the rotor shaft 30 while permitting the rotor 12 to rotate within an airgap 34 relative to a stator 36. The stator 36 may be disposed annularly around the rotor 12 for purposes of generating a rotating magnetic field (RMF), which as one skilled in the art may appreciate, may be used to impart a rotational torque sufficient for rotating the rotor 12. While not shown in detail, the stator 36 may include stator windings 38 wrapped around a plurality of circumferentially spaced stator protrusions 40, which when excited, may be capable of influencing the RMF and the resulting rotation of the rotor 12. The rotor 12 may include a plurality of rotor windings 44 wrapped around a plurality of circumferentially spaced rotor protrusions 46, which when excited, may be used to induce rotor magnetic fields. The rotor magnetic field may interact with the RMF to facilitate rotating the rotor shaft 30 to propel the vehicle 14 and/or for regenerative braking in response to rotation of the rotor shaft. The rotor 12 may be formed with a generally annular shape, optionally from a plurality of laminations stack in a side-by-side facing relationship axially along an access of rotation A. While generically shown in FIG. 1, and as described below in more detail below, the present disclosure contemplates the stator and rotor windings 38, 44 having a wide variety of configurations.

Figure 3:
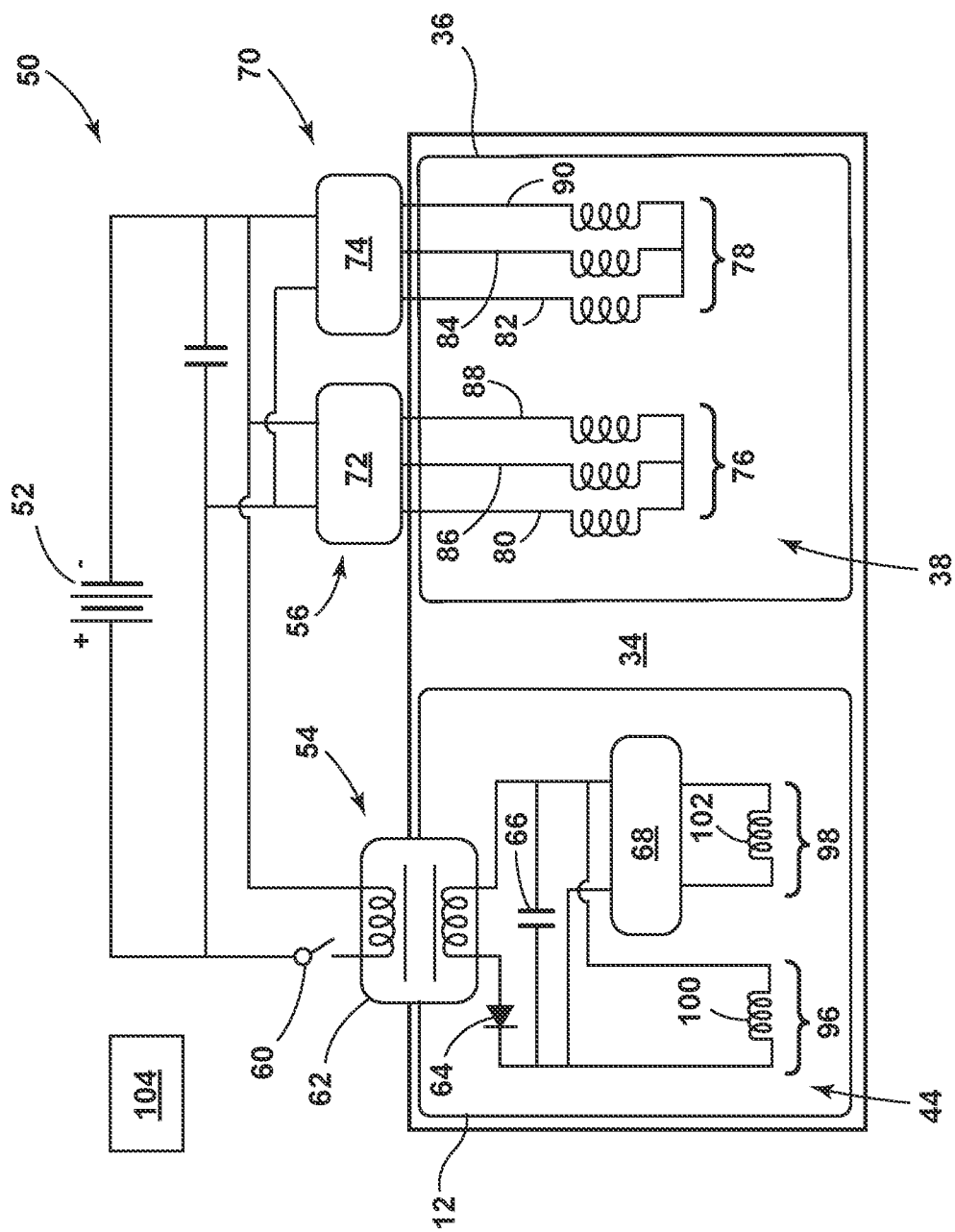
FIG. 3 illustrates a partial schematic circuit diagram of the electric machine in accordance with one non-limiting aspect of the present disclosure.

FIG. 3 illustrates a partial schematic circuit diagram of the electric machine 10 in accordance with one non-limiting aspect of the present disclosure. The electric machine 10 may include a power transfer circuit 50 configured for electrically exciting the rotor and stator windings. The power transfer circuit 50 may be operable to exchange electrical power with a power source 52, optionally with capacitive smoothing of a capacitor, etc. The power source 52 may be a rechargeable energy storage system (RESS) or other features suitable for providing direct current (DC) electrical power to and/or receiving electrical power from a rotor circuit portion 54 and/or a stator circuit portion 56 respectively associated with the rotor 12 and the stator 36. The rotor circuit portion 54 may include a switch 60 and a rotor interface 62 cooperating to facilitate providing a DC excitation current to the rotor windings 44, optionally with assistance of a diode 64, a capacitor 66, and a DC-DC converter. The rotor interface 62 may correspond with the illustrated transformer or inductive arrangement whereby the DC excitation current may be provided to the rotor windings 44 in a contactless manner. This is shown for exemplary purposes as the present disclosure fully contemplates contact based rotor interface configurations, such as but not necessarily limited to the use of brush and slip rings. The stator circuit portion 56 may include a stator interface 70 to facilitate providing an alternating current (AC) excitation current to the stator windings, such as in the form of a polyphase or a three-phase AC excitation current. The stator interface 70 may correspond with the illustrated first converter 72 and second inverter 74, however, the present disclosure fully contemplates other rotor interface configurations.

The stator windings 38 may be configured to include a plurality of stator winding sets 76, 78, optionally with each set wrapped around a corresponding plurality of the stator protrusions 40. As shown in the schematic view of FIG. 4, a first stator winding set 76, for example, may be wrapped relative to a first stator protrusion set (not individually labeled) of the stator protrusions and a second stator winding set 78 may be wrapped relative to a second stator protrusion set (not individually labeled) of the stator protrusions. The first and second stator winding sets 76, 78 may be provided in a three-phase configuration having a first stator leg 80, a second stator leg 82, a third stator leg 84, a fourth stator leg 86, a fifth stator leg 88, and a sixth stator leg 90, optionally in the illustrated manner with the first stator winding set 76 including the first, fourth, and fifth stator legs 80, 86, 88 and the second stator winding set 78 including the second, third, and sixth stator legs 82, 84, 90. The rotor windings 44 may be configured to include a plurality of rotor winding sets 96, 98, optionally with each set wrapped around a corresponding plurality of the rotor protrusions 46. A first rotor winding set 96, for example, may be wrapped relative to a first rotor protrusion set (not individually labeled) of the rotor protrusions 46 and a second rotor winding set 98 may be wrapped relative to a second rotor protrusion set (not individually labeled) of the rotor protrusions 46. The first and second rotor winding sets 96, 98 may be provided in a single-phase configuration having a first rotor leg 100 and a second rotor leg 102, optionally in the illustrated manner with the first rotor winding set 96 including the first rotor leg 100 and the second rotor winding set 98 including the second rotor leg 102.

Referring to FIG. 3, the power transfer circuit 50 may be operable for selectively controlling a polarity and/or a phase sequence of the excitation currents respectively provided to the first and second stator and rotor windings 76, 78, i.e., the DC excitation of the rotor windings 44 and the AC excitation of the stator windings 38. The power transfer circuit 50 may include a controller 104 having a computer-readable storage medium having a plurality of non-transitory instructions stored thereon, which when executed by one or more processors, may be operable for facilitating the processes, controls, and/or other activities attendant to facilitating the operations contemplated herein. The power transfer circuit 50 may be configured in this manner to selectively vary the polarity and/or the phase sequence of the excitation current so as to control the electric machine 10 to provide desirable or competitive torque, power, and/or efficiency levels, optionally without relying on the use of rare-earth, permanent, or other magnets to generate persistent magnetic fields i.e., to provide a magnet-free electric machine 10. Such a magnet-free electric machine 10 may be operable for actively controlling the excitation currents, and thereby, respectively generated stator and rotor poles. The excitation currents, for example, may be selected based on operating conditions and/or other metrics so as to correspondingly reconfigure the resulting rotor and stator poles in a manner intended to achieve targeted torque, power, and/or efficiency levels.

One non-limiting aspect of the present disclosure contemplates reconfiguring the rotor and stator poles such that under some circumstances the electric machine 10 may have a first quantity of resulting machines poles and under other circumstances a second quantity of machine poles without having to mechanically change the stator and/or rotor windings or to make other physical alterations to the electric machine 10 beyond correspondingly adjusting the polarity, phase sequence, or other characteristics of the excitation currents used to excite the state or rotor windings 38, 44. This capability to electronically or electrically reconfigure the rotor and/or stator poles, and thereby the resulting machine poles, may be beneficial in providing a variable pole machine (VPM) having capabilities tantamount to permanent magnet types of electric machines but without relying on permanent magnets to achieve targeted torque, power, and/or efficiency levels. One skilled in the art may appreciate, the rotor and/or stator poles combining to define the machine poles or what may be commonly referred to as a number of poles for the electric machine 10. In other words, the electric machine 10 may individually and selectively excite the stator and/or rotor windings 76, 78, or more particularly the stator and/or rotor winding sets 76, 78, 96, 98, to achieve a desired quantity of rotor and stator poles, e.g., the first or the second quantity of rotor and stator poles. The first and second quantities of rotor and stator poles, for example, may correspond with providing a P quantity of machine poles, such as four poles, and a 2P quantity of machine poles, e.g., eight poles. Similarly, more or less machine poles may be generated, for instance to facilitate switching between six and 12 pole configurations, eight and 16 pole configurations, etc., optionally with other increments, e.g., a 3P, 4P, etc. quantity of machine poles.

Figure 4:
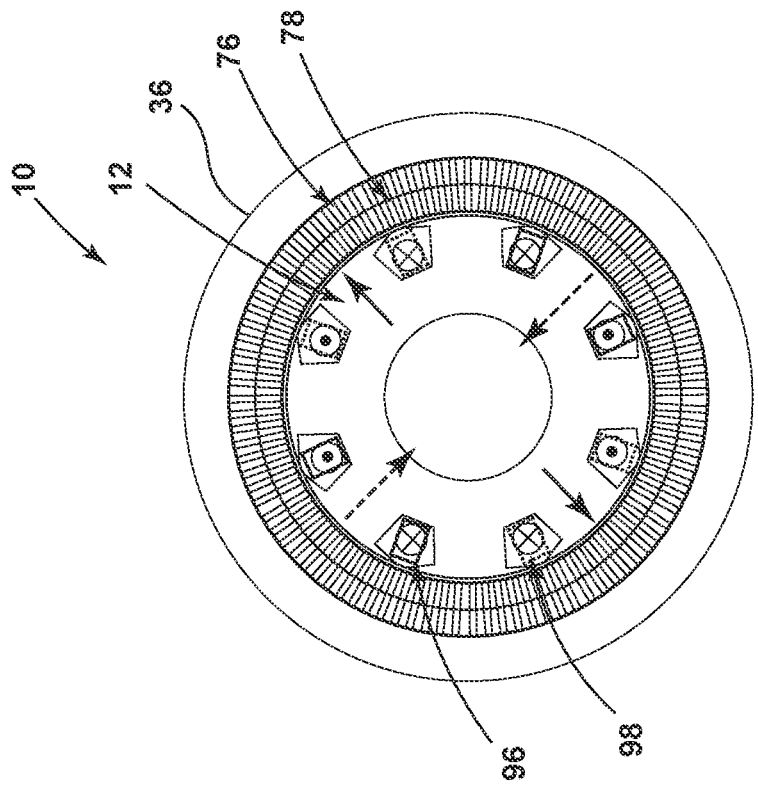
FIG. 4 illustrates a schematic diagram of an 8-pole configuration of the electric machine in accordance with one non-limiting aspect of the present disclosure.
Figure 5:
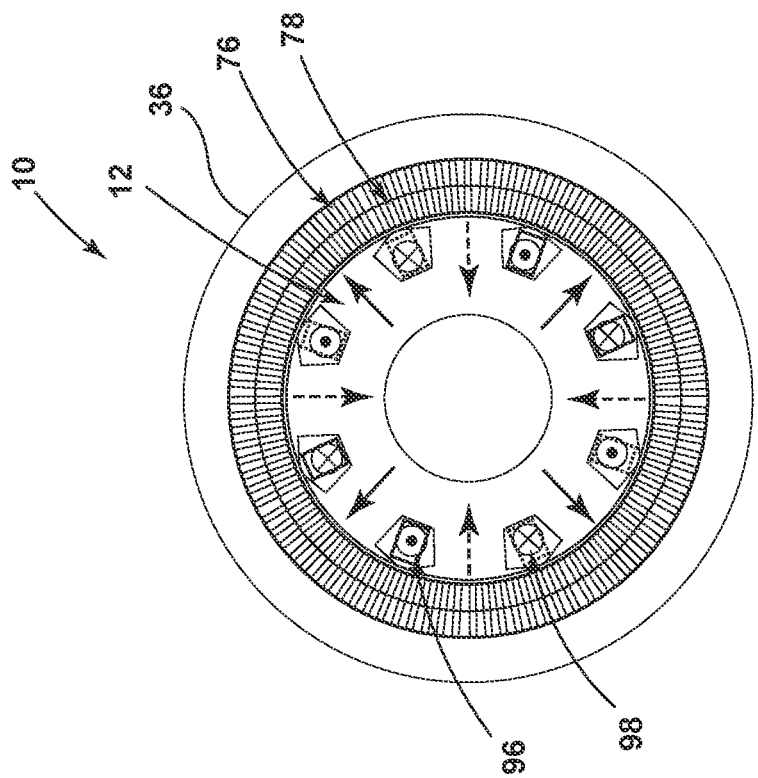
FIG. 5 illustrates a schematic diagram of a 4-pole configuration of the electric machine in accordance with one non-limiting aspect of the present disclosure.

FIG. 4 illustrates a schematic diagram of an 8-pole configuration of the electric machine 10 in accordance with one non-limiting aspect of the present disclosure. The 8-pole configuration may correspond with a first quantity of the stator poles interacting with a first quantity of the rotor poles, with the resulting poles and direction thereof indicated with arrows. FIG. 5 illustrates a schematic diagram of a 4-pole configuration for the electric machine 10 of FIG. 4 in accordance with one non-limiting aspect of the present disclosure. The 4-pole configuration may correspond with a second quantity of the stator poles interacting with a second quantity of the rotor poles, with the resulting poles and direction thereof indicated with arrows. The table shown below may be used to represent a polarity and phase sequence for exciting each of the stator and rotor winding sets 76, 78, 96, 98 to switch between the 8-pole and 4-pole configurations.

|  | Leg | 8-Pole | 4-Pole |
| --- | --- | --- | --- |
| First Stator Winding Set | 1 | A | A |
|  | 4 | B | C |
|  | 5 | C | B |
| Second Stator Winding Set | 2 | A' | -A' |
|  | 3 | B' | -C' |
|  | 4 | C' | -B' |
| First Rotor Winding Set | 1 | I | I |
| Second Rotor Winding Set | 1 | I' | -I' |

The 8-pole configuration may correspond with providing the polarity and the phase sequence of the excitation currents for the first stator winding set 76 with a first stator polarity and a first stator phase sequence, for the second stator winding set 78 with the first stator polarity and a second stator phase sequence, for the first rotor winding set 96 with a first rotor polarity and first rotor sequence, and for the second rotor winding set 98 with a the first rotor polarity and a second rotor sequence. The stator and rotor pole polarities may be defined relative to a positive polarity to the power source 52, i.e., with the first polarity corresponding with a positive polarity and the second polarity corresponding with a second polarity. The first stator phase sequence may include an A-phase, a B-phase, and a C-phase, with the first stator leg 80 receiving the A-phase, the fourth stator leg 86 receiving the B-phase, and the fifth stator leg 88 receiving the C-phase. The second stator phase sequence may include an A'-phase, a B'-phase, and a C'-phase, with the second stator leg 82 receiving the A'-phase, the third stator leg 84 receiving the B'-phase, and the sixth stator leg 90 receiving the C'-phase. The A-, B-, C-, A'-, B'-, and C'-phases may respectfully correspond with three-phase, AC currents output from the first and second inverters 72, 74, optionally with the A'-, the B'-, and C'-phases being time shifted, delayed, or otherwise sequenced differently relative to the corresponding A-, B-, and C-phases. The first rotor phase sequence may include an I-phase with the first rotor leg 100 receiving the I-phase, and the second rotor phase sequence may include an I'-phase with the second rotor leg 102 receiving the I'-phase. The I- and I'-phases may respectfully correspond with DC currents output to the first and second rotor winding sets from the DC-DC converter, optionally with the I'-phase being time shifted, delayed, or otherwise sequenced differently relative to the corresponding I-phase.

Figure 7:
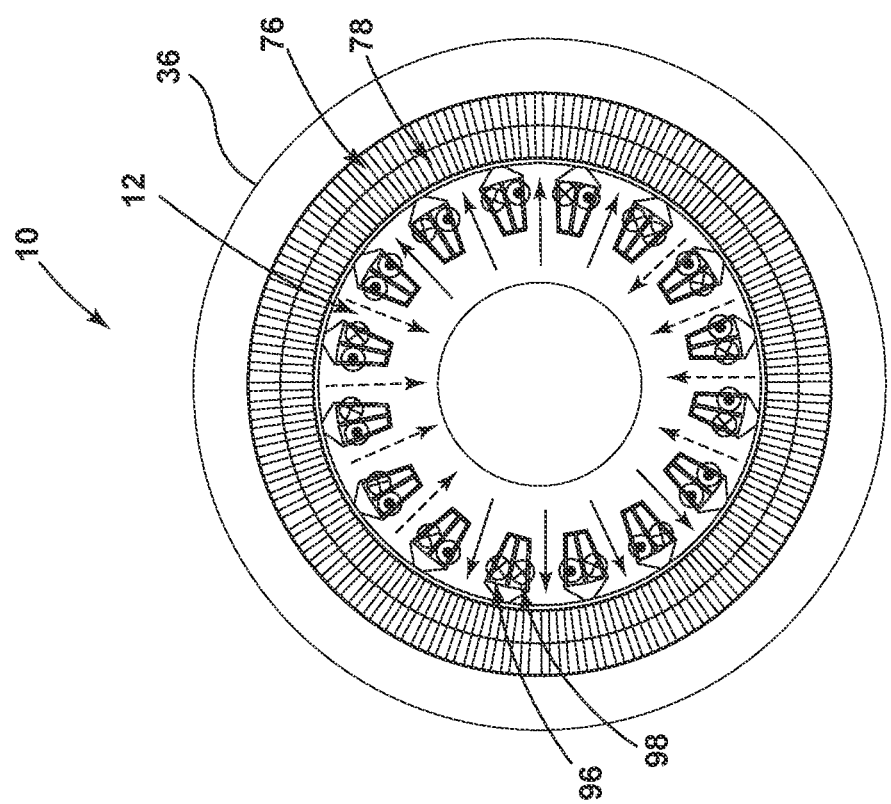
FIG. 7 illustrates a schematic diagram of a 4-pole configuration of the electric machine in accordance with one non-limiting aspect of the present disclosure.
Figure 6:
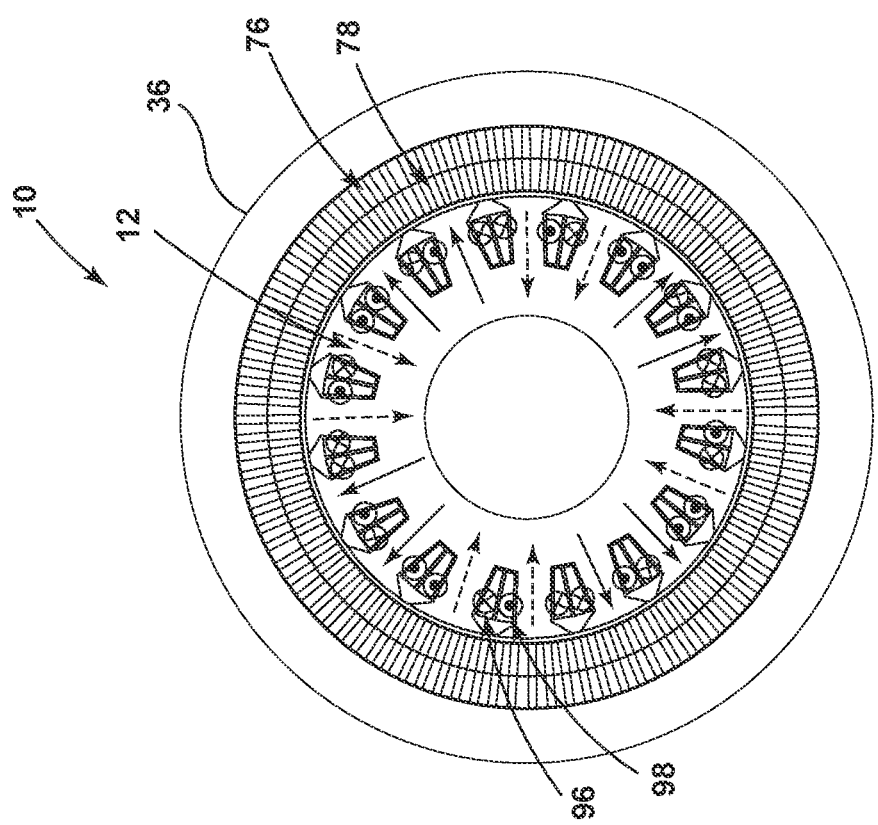
FIG. 6 illustrates a schematic diagram of an 8-pole configuration of the electric machine in accordance with one non-limiting aspect of the present disclosure.

FIG. 6 illustrates a schematic diagram of an 8-pole configuration of the electric machine 10 in accordance with one non-limiting aspect of the present disclosure. The concentrated configuration may correspond with the first and second rotor winding sets 96, 98 including the first and second rotor legs 100, 102 being wrapped around more rotor protrusions 46 than in the configuration of FIG. 4, e.g., having 16 salient poles as opposed to 8 salient poles. The 8-pole configuration may correspond with a first quantity of the stator poles interacting with a first quantity of the rotor poles, with the resulting poles and direction thereof being indicated with arrows such that the 8-poles result from combining two adjoining poles having the same directionality to form one pole. FIG. 7 illustrates a schematic diagram of a 4-pole configuration for the electric machine 10 of FIG. 6 in accordance with one non-limiting aspect of the present disclosure. The 4-pole configuration may correspond with a second quantity of the stator poles interacting with a second quantity of the rotor poles, with the resulting poles and direction thereof indicated with arrows such that the 4-poles result from combining four adjoining poles having the same directionality to form one pole. The excitation currents for the concentrated configuration may correspond with those presented in the table above, i.e., the same excitation currents may be used in the concentrated configuration for exciting the state and rotor windings 38, 44 between the 8-pole and 4-pole configurations.

Figure 8:
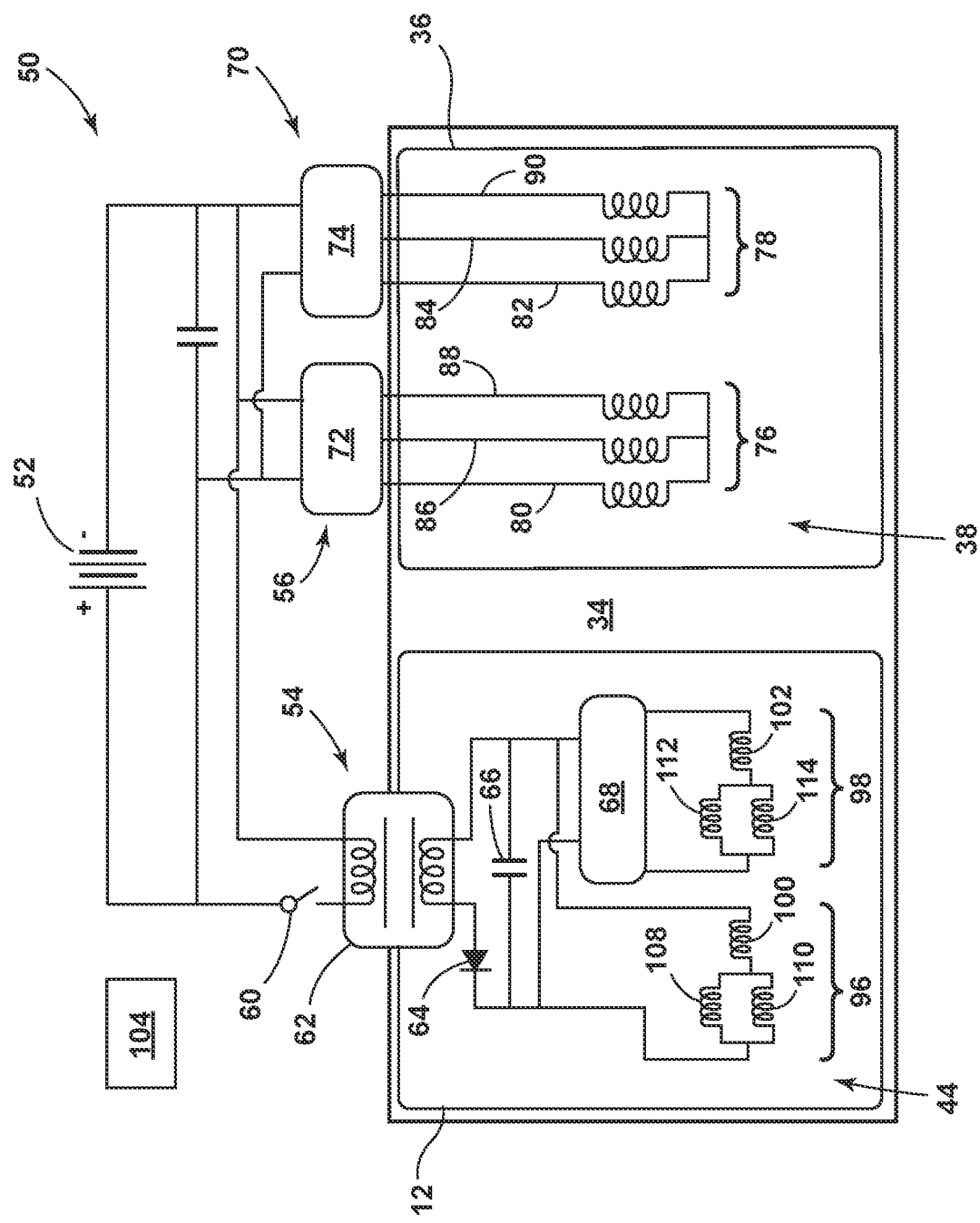
FIG. 8 illustrates a partial schematic circuit diagram of the electric machine having a three-phase rotor configuration in accordance with one non-limiting aspect of the present disclosure.

FIG. 8 illustrates a partial schematic circuit diagram of the electric machine 10 having a three-phase rotor configuration in accordance with one non-limiting aspect of the present disclosure. The electric machine 10 may be similar to that described above with respect to operation of the rotor and stator circuit portions 54, 56, with elements having common reference numerals performing similarly, with one difference being the first rotor winding set 96 additionally include a third rotor leg 108 and a fourth rotor leg 110, and the second rotor winding set 98 additionally including a fifth rotor leg 112 and a sixth rotor leg 114. In the exemplary use case of the electric machine 10 being configured for switching between four and eight poles, the table shown below may be used to represent a polarity and phase sequence for exciting each of the stator and rotor winding sets 76, 78, 96, 98 to switch between the 8-pole and 4-pole configurations.

|  | Leg | 8-Pole | 4-Pole |
| --- | --- | --- | --- |
| First Stator Winding Set | 1 | A | A |
|  | 4 | B | C |
|  | 5 | C | B |
| Second Stator Winding Set | 2 | A' | -A' |
|  | 3 | B' | -C' |
|  | 4 | C' | -B' |
| First Rotor Winding Set | 1 | I | I |
|  | 3 | -0.5I | -0.5I |
|  | 4 | -0.5I | -0.5I |
| Second Rotor Winding Set | 2 | I | -I |
|  | 5 | -0.5I | 0.5I |
|  | 6 | -0.5I | 0.5I |

Switching between the 4-pole and 8-pole configurations may correspond with providing the polarity and the phase sequence of the excitation currents for the first and second stator winding sets 76, 78 in the manner described above with respect to FIG. 4. With the additional rotor legs 108, 110, 112, 114 being added to the first and second rotor winding sets 96, 98, switching between the 4-pole and 8-pole configurations may correspond with providing the polarity and the phase sequence of excitation currents for the first and second rotor winding sets 96, 98 in a different manner relative to that described above with respect to FIG. 4. Due to the parallel and series connections and the directionality of some of the rotor legs 108, 110, 112, 114 being wrapped differently, the polarity and the phase sequence may include the I-phase and the I'-phase, with the rotor legs 108, 110, 112, 114 connected in parallel having half the excitation current and an opposite polarity relative to the excitation current of the rotor legs 100, 102 connected in series therewith. With the lower current demands, conductors forming the third, fourth, fifth and sixth rotor legs 108, 110, 112, 114 may have a smaller cross-sectional area relative to conductors forming the first and second rotor legs 100, 102.

Figure 9:
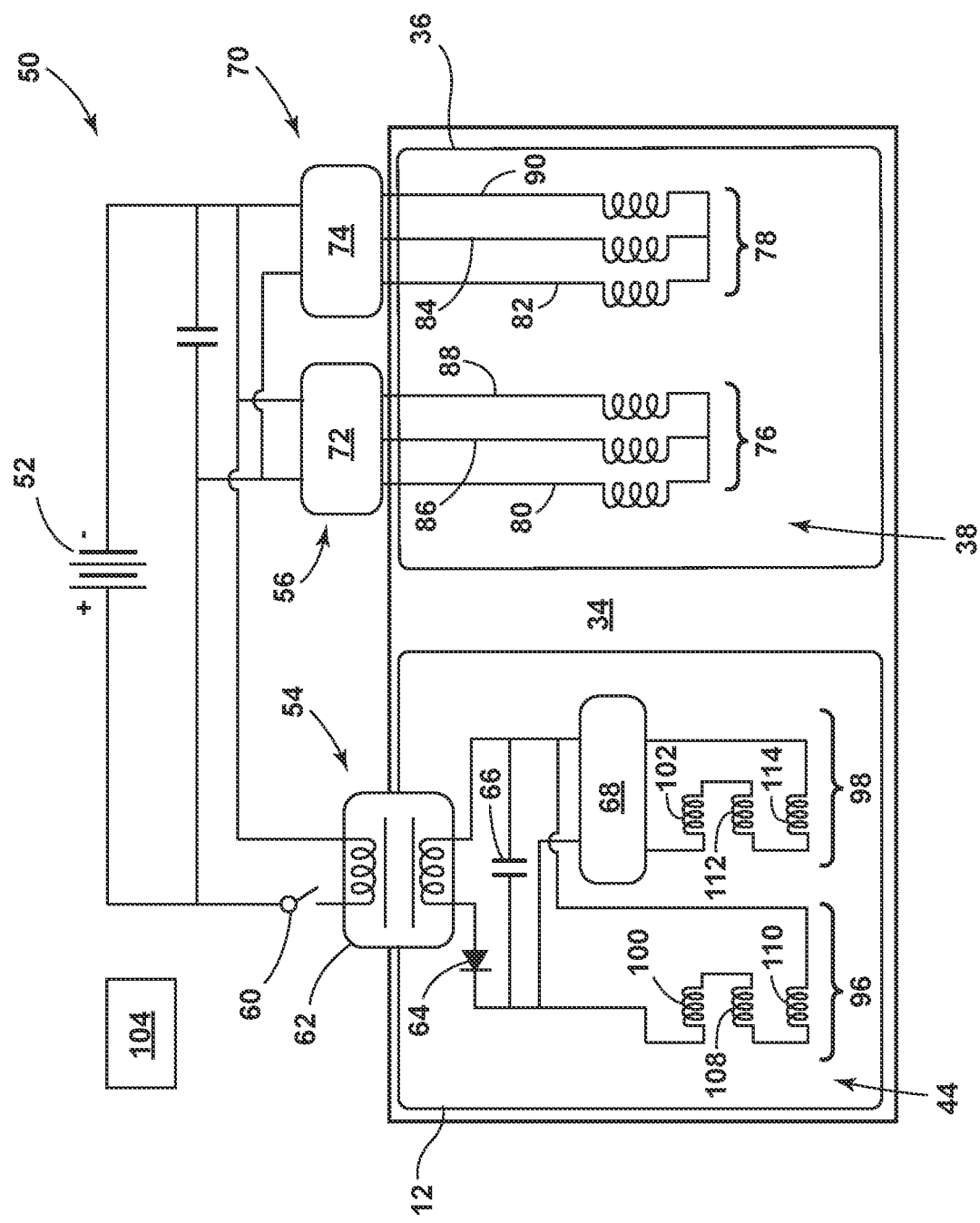
FIG. 9 illustrates a partial schematic circuit diagram of the electric machine having a series three-phase rotor configuration in accordance with one non-limiting aspect of the present disclosure.

FIG. 9 illustrates a partial schematic circuit diagram of the electric machine 10 having a series three-phase rotor configuration in accordance with one non-limiting aspect of the present disclosure. The electric machine 10 may be similar to that described above with respect to operation of the rotor and stator circuit portions 64, 56, with elements having common reference numerals performing similarly, with one difference being the first rotor winding set having the first, third, and fourth rotor 100, 108, 110 legs connected in series and the second rotor winding set 98 having the second, fifth, and sixth rotor legs 102, 112, 114 similarly connected in series. In the exemplary use case of the electric machine 10 being configured for switching between four and eight poles, the table shown below may be used to represent a polarity and phase sequence for exciting each of the stator and rotor winding sets 76, 78, 96, 98 to switch between the 8-pole and 4-pole configurations.

|  | Leg | 8-Pole | 4-Pole |
| --- | --- | --- | --- |
| First Stator Winding Set | 1 | A | A |
|  | 4 | B | C |
|  | 5 | C | B |
| Second Stator Winding Set | 2 | A' | -A' |
|  | 3 | B' | -C' |
|  | 4 | C' | -B' |
| First Rotor Winding Set | 1 | I | I |
|  | 3 | -I | -I |
|  | 4 | -I | -I |
| Second Rotor Winding Set | 2 | I | -I |
|  | 5 | -I | I |
|  | 6 | -I | I |

Switching between the 4-pole and 8-pole configurations may correspond with providing the polarity and the phase sequence of the excitation currents for the first and second stator and rotor winding sets 76, 78, 96, 98 in the manner described above with respect to FIG. 4. Unlike FIG. 8 and due to the series connections and the directionality of some of the rotor legs 108, 110, 112, 114 being wrapped differently, the polarity and the phase sequence may include the I-phase and the I'-phase with some rotor legs 108, 110, 112, 114 of the same rotor winding set 96, 98 receiving an opposite polarity. Because of the series connection, the third and fourth rotor legs 108, 110 may be wrapped with less turns of the conductors than the first rotor leg 100 and the fifth and sixth rotor legs 112, 114 may be wrapped with less turns of the conductors than the second rotor leg 102.

As supported above, the present disclosure relates to a magnet-less synchronous motor that can provide similar or better axle torque, power, and efficiency than a permanent magnet synchronous motor. The motor may actively change the stator pole number by controlling the polarity and/or phase sequence of stator inverter current, such by controlling the voltage polarity applied on the rotor winding using DC-DC converter or double pole double throw (DPDT) switch. The change of rotor pole in between different operation may be controller to maintain balance winding configuration in relation with stator pole changes, such as with the change of magnetic pole being determined with the same position sensor depending on the selection of the rotor pole. A high-pole-count may be used to achieve terrific axle torque, and low-pole-count to achieve low fundamental frequency, high speed, power, and efficiency. An increased air gap and retention sleeve may be used for high-speed capability, low torque ripple, low magnetic loading, low core loss, low AC copper loss, and/or to reduce back iron saturation in low-pole-count mode. Actively deactivate of specific coil(s) of the two groups of windings may be employed in certain working/load/fault conditions to improve the overall drive system efficiency and fault-tolerant capability. The coils from various winding sets may optionally not share the same slots so that fault in one winding does not spread to the other winding, thereby enabling a faulty machine to continue running on the remaining healthy winding. The power transfer circuit may be operable for choosing between high-pole mode and low-pole mode depending on the working condition, e.g., 1: the zero-efficiency-difference line, 2 specific speed level, 3 economic mode or watts-to-freedom mode, etc., optionally with corresponding control of the current for specific stator/rotor coils in different sequence, magnitude, etc., to achieve smooth pole changing with minimal transient. Reduce torque ripple and improved torque density may be provided due to overlaid airgap fields (e.g., eight pole and four pole field exist simultaneously through control), including optionally eliminating or minimizing unbalanced radial forces due to 180 degrees symmetry of the winding, which may be achieved by ensuring that the overlaid fluxes are apart by more than two poles. In some implementations, forced convection rotor cooling may be included and used for cooling channels on the rotor core or in-slot rotor cooling. When used with a vehicle, the vehicle may include a use multi-stage gearbox or planetary gearbox with proper gear ratio that can adapt the top speed in low-pole-count mode, optionally using an end ring for rotor end winding retention and rotor balancing at high speed.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A magnet-free synchronous electric motor with reconfigurable rotor and stator poles, comprising:
    a stator including a plurality of stator windings wrapped around a plurality of circumferentially spaced stator protrusions, wherein a first stator winding set of the stator windings are wrapped relative to a first stator protrusion set of the circumferentially spaced stator protrusions and a second stator winding set of the stator windings are wrapped relative to a second stator protrusion set of the circumferentially spaced stator protrusions, wherein the first stator winding set and the second stator winding set together include a first leg, a second leg, a third leg, a fourth leg, a fifth leg, and a sixth leg;
    a rotor including a plurality of rotor windings wrapped around a plurality of circumferentially spaced rotor protrusions, wherein a first rotor winding set of the rotor windings are wrapped relative to a first rotor protrusion set of the circumferentially spaced rotor protrusions and a second rotor winding set of the rotor windings are wrapped relative to a second rotor protrusion set of the circumferentially spaced rotor protrusions; and
    a power transfer circuit configured for controlling a polarity and/or a phase sequence of excitation currents used in exciting the first and second stator and rotor windings and thereby respectively generated stator and rotor poles, including providing a first quantity of stator poles and a second quantity of stator poles each with at least four phase sequences, including:
    a first phase sequence that includes an A-phase, a B-phase, and a C-phase, with the first leg receiving the A-phase, the fourth leg receiving the B-phase, and the fifth leg receiving the C-phase;
    a second phase sequence that includes an A'-phase, a B'-phase, and a C'-phase, with the second leg receiving the A'-phase, the third leg receiving the B'-phase, and the sixth leg receiving the C'-phase;
    a third phase sequence that includes the A-phase, the B-phase, and the C-phase, with the first leg receiving the A-phase, the fourth leg receiving the C-phase, and the fifth leg receiving the B-phase; and
    a fourth phase sequence that includes the A'-phase, the B'-phase, and the C'-phase, with the second leg receiving the A'-phase, the third leg receiving the C'-phase, and the sixth leg receiving the B'-phase.

2. The magnet-free synchronous electric motor according to claim 1, wherein:
    the power transfer circuit is operable for providing the first quantity of the stator poles by:
        providing the first stator winding set with the polarity and the phase sequence of the excitation currents thereof respectively having a first polarity and a first phase sequence; and
        providing the second stator winding set with the polarity and the phase sequence of the excitation currents thereof respectively having the first polarity and a second phase sequence.

3. The magnet-free synchronous electric motor according to claim 2, wherein:
    the power transfer circuit is operable for providing the second quantity of the stator poles by:
        providing the first stator winding set with the polarity and the phase sequence of the excitation currents thereof respectively having the first polarity and a third phase sequence; and providing the second stator winding set with the polarity and the phase sequence of the excitation currents thereof respectively having a second polarity opposite to the first polarity and a fourth phase sequence.

4. The magnet-free synchronous electric motor according to claim 1, wherein:
the first stator winding set includes the first leg, the fourth leg, and the fifth leg; and
the second stator winding set includes the second leg, the third leg, and the sixth leg.

5. The magnet-free synchronous electric motor according to claim 3, wherein:
the first polarity corresponds with a positive polarity; and
the second polarity corresponds a negative polarity.

6. The magnet-free synchronous electric motor according to claim 1, wherein:
the power transfer circuit is operable for providing a first quantity of the rotor poles by:
providing the first rotor winding set with the polarity of the excitation currents thereof having a first polarity; and
providing the second rotor winding set with the polarity of the excitation currents thereof having the first polarity.

7. The magnet-free synchronous electric motor according to claim 6, wherein:
the power transfer circuit is operable for providing a second quantity of the rotor poles by:
providing the first rotor winding set with the polarity of the excitation currents thereof having the first polarity; and
providing the second rotor winding set with the polarity of the excitation currents thereof having a second polarity opposite to the first polarity.

8. The magnet-free synchronous electric motor according to claim 7, wherein:
the first and second rotor windings each have a single-phase configuration such that the first rotor windings are arranged to include no more than a first rotor leg and the second rotor windings are arranged to include no more than a second rotor leg.

9. The magnet-free synchronous electric motor according to claim 7, wherein:
the first and second rotor windings each have a three-phase configuration, with the first rotor windings arranged to include a first rotor leg, a second rotor leg, and a third rotor leg and the second rotor windings arranged to include a fourth rotor leg, a fifth rotor leg, and a sixth rotor leg.

10. The magnet-free synchronous electric motor according to claim 9, wherein:
the three-phase configuration includes the first, second, and third rotor legs connected in series and the fourth, fifth, and sixth rotor legs connected in series.

11. The magnet-free synchronous electric motor according to claim 10, wherein:
the first, second, third, fourth, fifth, and sixth rotor legs are formed with conductors, wherein the second and third rotor legs are wrapped with less turns of the conductors than the first rotor leg and the fifth and sixth rotor legs are wrapped with less turns of the conductors than the fourth rotor leg.

12. The magnet-free synchronous electric motor according to claim 9, wherein:
the three-phase configuration includes the first rotor leg connecting in parallel with the second rotor leg and the first and second rotor legs connected in series with the third rotor leg, and the fourth quarter leg connecting a parallel with the fifth rotor leg and the fourth and fifth rotor legs connected in series with the sixth rotor leg.

13. The magnet-free synchronous electric motor according to claim 12, wherein:
the first, second, third, fourth, fifth, and sixth rotor legs are formed with conductors, wherein the conductors of the first and second legs have a smaller cross-sectional area than the conductors of the third rotor leg and the conductors of the fourth and fifth rotor legs have a smaller cross-sectional area than the conductors of the sixth rotor leg.

14. An electric machine with reconfigurable machine poles, comprising:
a stator having a plurality of stator windings arranged into a first stator leg, a second stator leg, a third stator leg, a fourth stator leg, a fifth stator leg, and a sixth stator leg;
a rotor having a plurality of rotor windings arranged into a first rotor leg and a second rotor leg;
a power transfer circuit configured for providing:
a first quantity of machine poles by delivering excitation currents to the first, fourth, and fifth stator legs with a first polarity and a first phase sequence, to the second, third, and sixth stator legs with the first polarity and a second phase sequence, and the first rotor leg with the first polarity and to the second rotor leg with the first polarity;
a second quantity of machine poles by delivering excitation currents to the first, fourth, and fifth legs with the first polarity and a third phase sequence, to the second, third, and sixth legs with a second polarity and a fourth phase sequence, to the first rotor leg with the first polarity and to the second rotor leg with the second polarity.

15. The electric machine according to claim 14, wherein:
the first and second rotor legs each have a single-phase configuration.

16. The electric machine according to claim 14, wherein:
the first and second rotor legs each have a three-phase configuration, wherein the three-phase configuration includes a first rotor leg, a second rotor leg, and a third rotor leg connected in series, wherein the first, second, and third rotor legs are formed with conductors such that the first and second rotor legs are wrapped with less turns of the conductors than the third rotor leg.

17. The electric machine according to claim 16, wherein:
the first and second rotor legs each have a three-phase configuration, wherein the three-phase configuration includes a first rotor leg, a second rotor leg, and a third rotor leg, with the first rotor leg connecting in parallel with the second rotor leg and the first and second rotor legs connected in series with the third rotor leg.

18. The electric machine according to claim 17, wherein:
the first, second, and third legs are formed with conductors, wherein the conductors of the first and second legs have a smaller cross-sectional area than the conductors of the third leg.

19. A vehicle, comprising:
a plurality of wheels;
a powertrain; and
a magnet-free synchronous electric motor with reconfigurable rotor and stator poles configured for converting electrical power to mechanical power for purposes of propelling the vehicle, the electric motor including a rotor shaft coupled with a rotor to the plurality of wheels via the powertrain, wherein the electric motor includes:
- a stator including a plurality of stator windings wrapped around a plurality of circumferentially spaced stator protrusions, wherein a first stator winding set of the stator windings are wrapped relative to a first stator protrusion set of the circumferentially spaced stator protrusions and a second stator winding set of the stator windings are wrapped relative to a second stator protrusion set of the circumferentially spaced stator protrusions, wherein the first stator winding set and the second stator winding set together include a first leg, a second leg, a third leg, a fourth leg, a fifth leg, and a sixth leg;
- a rotor including a plurality of rotor windings wrapped around a plurality of circumferentially spaced rotor protrusions, wherein a first rotor winding set of the rotor windings are wrapped relative to a first rotor protrusion set of the circumferentially spaced rotor protrusions and a second rotor winding set of the rotor windings are wrapped relative to a second rotor protrusion set of the circumferentially spaced rotor protrusions; and
- a power transfer circuit configured for controlling a polarity and/or a phase sequence of excitation currents used in exciting the first and second stator and rotor windings and thereby respectively generated stator and rotor poles, including providing a first quantity of stator poles and a second quantity of stator poles each with at least four phase sequences, including:
  - a first phase sequence that includes an A-phase, a B-phase, and a C-phase, with the first leg receiving the A-phase, the fourth leg receiving the B-phase, and the fifth leg receiving the C-phase;
  - a second phase sequence that includes an A'-phase, a B'-phase, and a C'-phase, with the second leg receiving the A'-phase, the third leg receiving the B'-phase, and the sixth leg receiving the C'-phase;
  - a third phase sequence that includes the A-phase, the B-phase, and the C-phase, with the first leg receiving the A-phase, the fourth leg receiving the C-phase, and the fifth leg receiving the B-phase; and
  - a fourth phase sequence that includes the A'-phase, the B'-phase, and the C'-phase, with the second leg receiving the A'-phase, the third leg receiving the C'-phase, and the sixth leg receiving the B'-phase.

* * * * *